(12) United States Patent
Yue et al.

(10) Patent No.: US 8,939,088 B2
(45) Date of Patent: Jan. 27, 2015

(54) BOTTOM DOOR OPENING-CLOSING MECHANISM, BOTTOM DOOR DEVICE AND DROP-BOTTOM HOPPER CAR

(75) Inventors: Linghan Yue, Qiqihar (CN); Tianjun Zhao, Qiqihar (CN); Baichuan He, Qiqihar (CN); Shuang Yang, Qiqihar (CN); Lei Yu, Qiqihar (CN)

(73) Assignee: Qiqihar Railway Rolling Stock Co., Ltd., Qiqihar (CN)

( * ) Notice: Subject to any disclaimer, the term of this patent is extended or adjusted under 35 U.S.C. 154(b) by 0 days.

(21) Appl. No.: 13/876,842

(22) PCT Filed: Aug. 28, 2012

(86) PCT No.: PCT/CN2012/080648
§ 371 (c)(1),
(2), (4) Date: Mar. 28, 2013

(87) PCT Pub. No.: WO2013/060189
PCT Pub. Date: May 2, 2013

(65) Prior Publication Data
US 2014/0216299 A1 Aug. 7, 2014

(30) Foreign Application Priority Data

Oct. 28, 2011 (CN) .......................... 2011 1 0334675

(51) Int. Cl.
*B61D 7/24* (2006.01)
*B61D 7/28* (2006.01)
(Continued)

(52) U.S. Cl.
CPC *F16H 21/44* (2013.01); *B61D 7/28* (2013.01); *B61D 7/18* (2013.01); *B61D 7/02* (2013.01); *E05F 15/02* (2013.01)
USPC .......................................... 105/291; 105/286

(58) Field of Classification Search
CPC .................................... B61D 7/24; B61D 7/28
USPC ................................................... 105/286–291
See application file for complete search history.

(56) References Cited

U.S. PATENT DOCUMENTS

| 3,435,558 A | 4/1969 | Kruse |
| 3,772,996 A | 11/1973 | Schuller |

(Continued)

FOREIGN PATENT DOCUMENTS

| AU | 2008202910 A1 | 1/2010 |
| CA | 1117371 A1 | 2/1982 |
| CN | 202320408 U | 7/2012 |

*Primary Examiner* — Zachary Kuhfuss
(74) *Attorney, Agent, or Firm* — Kilpatrick Townsend & Stockton LLP

(57) ABSTRACT

A bottom door opening-closing mechanism includes a first connecting rod, a second connecting rod, a swing rod, a bottom door opening-closing drive cylinder and a transmission shaft. The swing rod is hinged to the second connecting rod and the piston rod of the bottom door opening-closing drive cylinder. One end of the first connecting rod is hinged to the second connecting rod, and the transmission shaft is connected to the second connecting rod. The cylinder body of the bottom door opening-closing drive cylinder is fixedly connected with a first locking hook, and the swing rod is fixedly connected with a second locking hook which can be caught by the first locking hook. A bottom door device and a drop-bottom hopper car are further provided. In the present invention, the first locking hook and the second locking hook are caught with each other to achieve a secondary locking. Such an arrangement has some advantages such as a simple structure and low manufacture and maintenance costs. Further, a secondary locking may be achieved while closing the bottom door only by controlling the bottom door opening-closing drive cylinder, so that the complexity of the control system is reduced.

20 Claims, 3 Drawing Sheets

(51) Int. Cl.
  *B61D 7/18* (2006.01)
  *F16H 21/44* (2006.01)
  *B61D 7/02* (2006.01)
  *E05F 15/02* (2006.01)

(56) References Cited

U.S. PATENT DOCUMENTS 4,163,424 A  8/1979 Lindauer
4,843,974 A  7/1989 Ritter et al.

BOTTOM DOOR OPENING-CLOSING MECHANISM, BOTTOM DOOR DEVICE AND DROP-BOTTOM HOPPER CAR

This application is the US national phase of International Application No. PCT/CN2012/080648 filed on Aug. 28, 2012, which claims the benefit of priority to the Chinese Patent Application No. 201110334675.6, titled "BOTTOM DOOR OPENING-CLOSING MECHANISM, BOTTOM DOOR DEVICE AND DROP-BOTTOM HOPPER CAR" and filed with the state Intellectual Property Office on Oct. 28, 2011, which is incorporated herein by reference in its entirety.

FIELD OF THE INVENTION

The invention relates to the technical field of railway freight cars, and particularly to a bottom door opening-closing mechanism, a bottom door device and a drop-bottom hopper car.

BACKGROUND OF THE INVENTION

A drop-bottom hopper car is mainly used fir carrying bulk cargo on a railway line and is designed to unload the bulk cargo either onto a conveying belt or into a pit between rails in a bottom dump manner after the car arrives at a destination. A discharge door (called as "bottom door") at the bottom of the existing drop-bottom hopper car is generally opened and closed by a five-rod-linkage eccentric self-locking mechanism (i.e. a bottom door opening-closing mechanism).

Since the unloading door of the drop-bottom hopper car is located at the bottom of the car body, the existing drop-bottom hopper car is provided with a secondary locking mechanism in order to prevent the bottom door from being accidentally opened during the transportation to unload the cargo onto the tracks and thus to cause danger to the traffic safety As shown in FIG. 1, the existing secondary locking mechanism includes two locking arms 3 and one secondary locking cylinder 5, wherein the two locking arms 3 are hinged onto a car body 1, and the secondary locking cylinder 5 is hinged between the two locking arms 3. After the two bottom doors 2 are closed, the secondary locking cylinder 5 retracts and brings the two locking arms 3 into rotation to shut till the locking arms 3 hook onto the respective transmission shafts 4 arranged on the bottom doors 2. When the car moves, the locking arms 3 are always kept in position, i.e. the secondary locking mechanism is ensured to be kept in a locking position. Thus, even when the bottom door opening-closing mechanism fails and the sealing function is lost, since the secondary locking mechanism is provided and kept in a locking position, the bottom doors 2 are prevented from being opened, so as to avoid the discharge of the cargo and to ensure the traffic safety.

Though the above-mentioned secondary locking mechanism can prevent the bottom doors from being opened accidentally, there is a need to mount the locking arms 3 and the secondary locking cylinder 5. Thus, both the manufacture cost and the maintenance cost are increased. Additionally, when the bottom doors are desired to be opened, the secondary locking mechanism is firstly actuated to unlock the bottom doors, and the bottom door opening-closing mechanism then follows to open the bottom doors. When the bottom doors are desired to be closed, the bottom door opening-closing mechanism is firstly actuated to close the bottom doors, and the secondary locking mechanism then follows to lock the bottom doors. As can be seen from the above, there is a logic order in the processes of the opening/closing of the bottom doors and the unlocking/locking of the secondary locking mechanism, so that a control system for controlling the opening/closing of the bottom doors 2 becomes relatively complicated.

SUMMARY OF THE INVENTION

In view of the above-mentioned disadvantages in the prior art, the present invention provides a bottom door opening-closing mechanism, a bottom door device and a drop-bottom hopper car, which are simple in structure, have low manufacture and maintenance costs and can reduce the complexity of the control system.

A bottom door opening-closing mechanism according to the present invention includes a first connecting rod, a second connecting rod, a swing rod, a bottom door opening-closing drive cylinder and a transmission shaft, wherein the swing rod is hinged to the second connecting rod and a piston rod of the bottom door opening-closing drive cylinder, one end of the first connecting rod is hinged to the second connecting rod, the transmission shaft is connected to the second connecting rod, and a connection joint between the transmission shaft and the second connecting rod is located between a hinge point between the first connecting rod and the second connecting rod and a hinge point between the second connecting rod and the swing rod, a cylinder body of the bottom door opening-closing drive cylinder is fixedly connected with a first locking hook, and the swing rod is fixedly connected with a second locking hook, the second locking hook and the first locking hook are configured to be capable of catching with each other.

The invention further provides a bottom door device, including two bottom doors and the bottom door opening-closing mechanism mentioned above. The transmission shaft of the bottom door opening-closing mechanism is rotatably connected to one of the bottom doors, and the other one of the bottom doors is hinged to the first connecting rod of the bottom door opening-closing mechanism.

The invention further provides a drop-bottom hopper car, including a car body with a discharge opening at the bottom thereof, and the above-mentioned bottom door device. The bottom doors of the above-mentioned bottom door device are hinged at the discharge opening. The cylinder body of the bottom door opening-closing drive cylinder of the above-mentioned bottom door device is hinged to the car body. There is a clearance between the transmission shaft of the above-mentioned bottom door device and the swing rod of the above-mentioned bottom door device.

In the bottom door opening-closing mechanism, the bottom door device and the drop-bottom hopper car according to the present invention, a first locking hook and a second locking hook which can be hooked with each other are arranged on the cylinder body of the bottom door opening-closing drive cylinder and the swing rod respectively, so as to prevent the bottom doors from being opened unexpectedly due to failure of the bottom door opening-closing mechanism. A secondary locking is achieved by the arrangement in which the first locking hook and the second locking hook are connected with each other, so as to prevent the bottom doors from being opened accidentally Such an arrangement has some advantages such as a simple structure, and low manufacture and maintenance costs. Additionally, by means of the above-mentioned arrangement, the secondary locking may be achieved while closing the bottom door only by controlling the bottom door opening-closing drive cylinder, so that the complexity of the control system is reduced.

DETAILED DESCRIPTION OF THE INVENTION

The present invention will be described in detail hereinafter in conjunction with the accompanying drawings and the specific embodiments.

Figure 1:
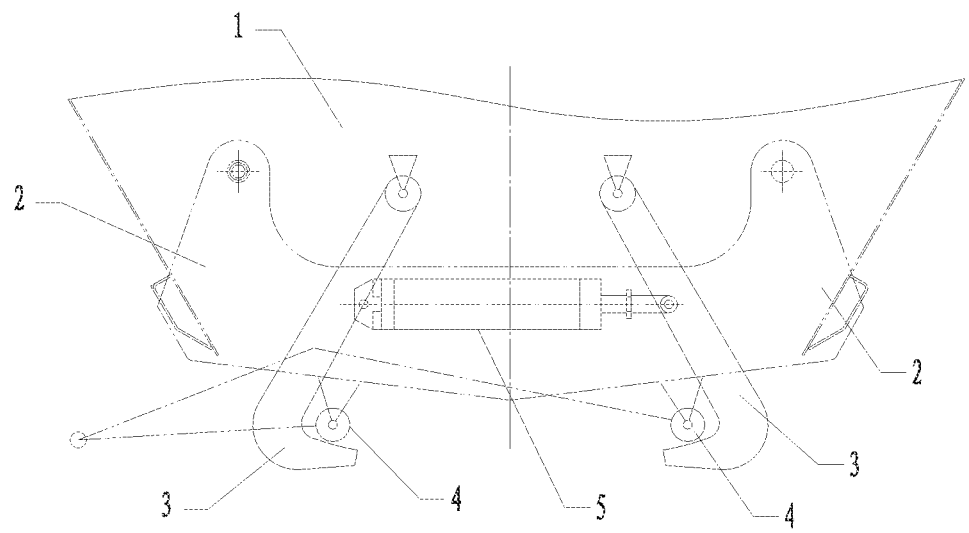
FIG. 1 is a schematic structural diagram of a secondary locking mechanism of a drop-bottom hopper car in the prior art.
Figure 2:
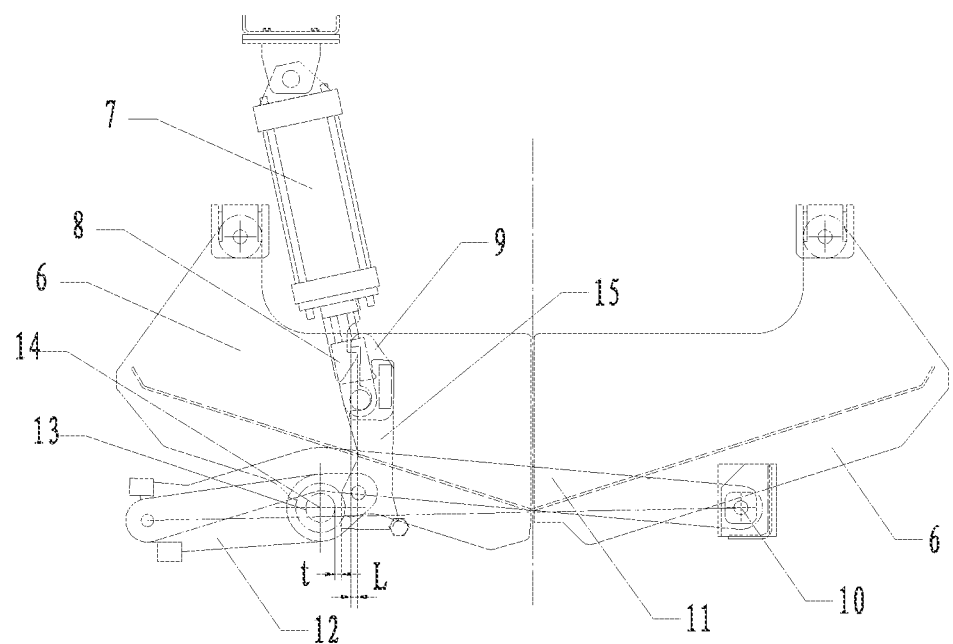
FIG. 2 is a schematic structural diagram of a bottom door opening-closing mechanism of a drop-bottom hopper car according to an embodiment of the present invention.

FIG. 2 is a schematic structural diagram of a bottom door opening-closing mechanism of a drop-bottom hopper car according to an embodiment of the present invention, Referring to FIG. 2, in the embodiment, the bottom door opening-dosing mechanism includes a first connecting rod 11, a second connecting rod 12, a swing rod 15, a bottom door opening-closing drive cylinder 7 and a transmission shaft 13. The swing rod 15 is hinged to the second connecting rod 12 and a piston rod of the bottom door opening-closing drive cylinder 7. One end of the first connecting rod 111 is hinged to the second connecting rod 12. The transmission shaft 13 is connected to the second connecting rod 12. The connection joint between the transmission shaft 13 and the second connecting rod 12 is located between a. hinge joint between the first connecting rod 11 and the second connecting rod 12 and a hinge joint between the second connecting rod 12 and the swing rod 15. The cylinder body of the bottom door opening-closing drive cylinder 7 is fixedly connected with a first locking hook 8, and the swing rod 15 is fixedly connected with a second locking hook 9 which can be caught with the first locking hook 8.

In the above-mentioned solution, the first locking hook 8 and the second locking hook 9 which can be caught with each other are arranged on the cylinder body and the swing rod 15 respectively, so as to prevent the bottom doors 6 from being opened unexpectedly due to failure of the bottom door opening-closing mechanism. By means of the arrangement in which the first locking hook 8 and the second locking hook 9 are caught with each other, a secondary locking is achieved, so as to prevent the bottom doors 6 from being opened accidentally, Such an arrangement has some advantages such as a simple structure and low manufacture and maintenance costs. Additionally, by means of the above-mentioned arrangement, the secondary locking may be achieved while closing the bottom doors only by controlling the bottom door opening-closing drive cylinder, so that the complexity of the control system is reduced.

Reference is also made to FIG. 2 for a bottom door device according to an embodiment of the present invention. Based on the above-mentioned embodiment, the bottom door device further includes two bottom doors 6 in addition to the bottom door opening-closing device of the above-mentioned embodiment. In FIG. 2, the transmission shaft 13 is rotatably connected to one bottom door 6 on the left side, and one bottom door 6 on the right side is hinged to the right end of the first connecting rod 11 of the bottom door opening-closing mechanism.

Descriptions of more details and preferred structures and the working process of the bottom door opening-closing mechanism and the bottom door device mentioned above may refer to the embodiments of the drop-bottom hopper car hereinafter.

As shown in FIG. 2, a drop-bottom hopper car according to an embodiment of the present invention includes bottom doors 6, a first connecting rod 11, a second connecting rod 12, a swing rod 15, a bottom door opening-closing drive cylinder 7, and a car body (not shown) provided with a discharge opening at its bottom. The two bottom doors 6 being fittingly hinged to the car body are arranged at the discharge opening. One of the bottom doors 6 is connected to the second connecting rod 12 via the transmission shaft 13, and the other one of the bottom doors 6 is connected to the second connecting rod 12 via the first connecting rod 11. The swing rod 15 is hinged to the second connecting rod 12 and the piston rod of the bottom door opening-closing drive cylinder 7. The cylinder body of the bottom door opening-closing drive cylinder 7 is hinged to the car body. There is a clearance t between the transmission shaft 13 and the swing rod 15. The cylinder body is fixedly connected with the first locking hook 8, and the swing rod 15 is fixedly connected with the second locking hook 9 which can be caught with the first locking hook 8.

In the above-mentioned solution, the first locking hook 8 and the second locking hook 9 which can be caught with each other are arranged on the cylinder body and the swing rod 15 respectively, so as to prevent the bottom doors 6 from being opened accidentally due to failure of the bottom door opening-closing mechanism. By means of the arrangement in which the first locking hook 8 and the second locking hook 9 are caught with each other, a secondary locking is achieved, so as to prevent the bottom doors 6 from being opened accidentally. Such an arrangement has some advantages such as a simple structure and low manufacture and maintenance costs. Additionally, by means of the above-mentioned arrangement, the secondary locking may be achieved while closing the bottom doors only by controlling the bottom door opening-closing drive cylinder, so that the complexity of the control system is reduced.

Specifically, the two bottom doors 6 are hinged at the discharge opening of the car body to form a double-door structure, and both axes of hinged shafts for the two bottom doors 6 are horizontal. A hinge joint is arranged at the bottom of each of the bottom doors 6 at a position near the center. In FIG. 2, the hinge joint at the bottom of the bottom door 6 on the left side is referred to as a first hinge joint 14, and the hinge joint at the bottom of the bottom door 6 on the right side is referred to as a second hinge joint 10. A transmission shaft 13 is mounted at the first hinge joint 14 and is rotatably fitted with the bottom door 6 on the left side. An end of the transmission shaft 13 is fixedly connected to the second connecting rod 12 at a position being closer to the right end of the second connecting rod 12. The left end of the second connecting rod 12 is hinged to one end of the first connecting rod 11, and the other end of the first connecting rod 11 is hinged at the second hinge joint 10. The right end of the second connecting rod 12 is hinged to the swing rod 15 arranged upwardly, and the upper end of the swing rod 15 is hinged to the piston rod of the bottom door opening-closing drive cylinder 7 hinged to the car body. The bottom door opening-closing drive cylinder 7 may be any one of a pneumatic cylinder, a hydraulic cylinder and a linear actuator. In this embodiment, the bottom door opening-closing drive cylinder 7 is a pneumatic cylinder. The cylinder body of the bottom door opening-closing drive cylinder 7 is fixedly connected with a first locking hook 8 positioned at the lower end of the cylinder body. The upper end of the swing rod 15 is fixedly connected with a second locking hook 9. The first locking hook 8 and the 9 can be caught with each other to prevent the bottom doors 6 from being opened accidentally when the car is traveling. Additionally, there is a clearance t between the transmission shaft 13 and the swing rod 15. Because of the presence of the clearance t, the bottom doors 6 may rotate downwardly about their respective hinge joints when the bottom door opening-closing mechanism fails. In the process, the swing rod 15 can descend with the rotation of the bottom door 6 on the left side, and the swing rod 15 drives the second locking hook 9 to descend, so that the second locking hook 9 is caught with the first locking hook 8 to prevent the bottom doors 6 from rotating downwardly about their respective hinge joints, thereby achieving the secondary locking of the bottom doors 6.

Figure 3:
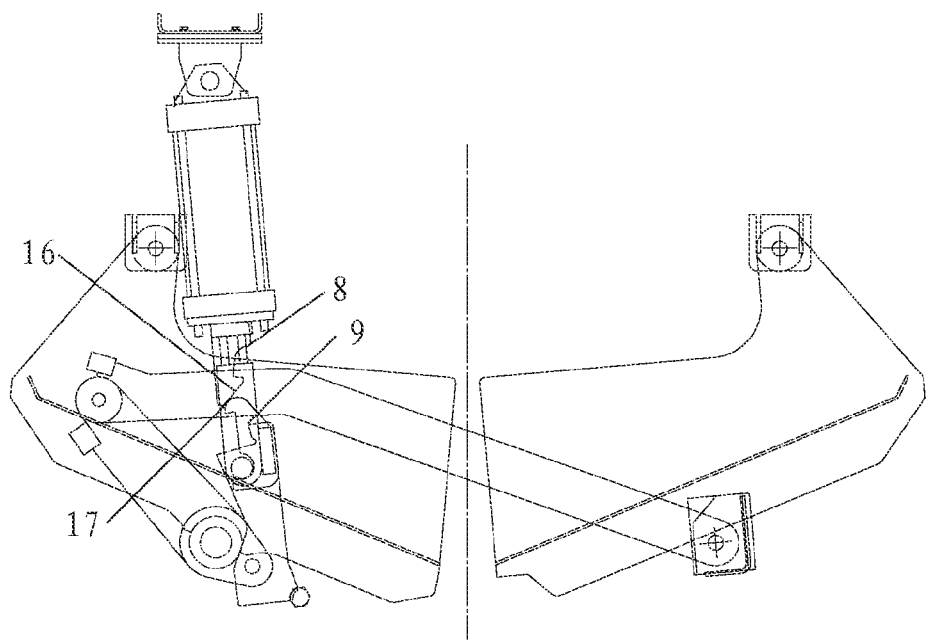
FIG. 3 is a schematic structural diagram of a first locking hook and a second locking hook in the bottom door opening-closing mechanism according to an embodiment of the present invention, wherein guiding surfaces of the first locking hook and the second locking hook are in contact with each other for guiding.

Additionally, FIG. 3 is a schematic structural diagram of a first locking hook and a. second locking hook in the bottom door opening-closing mechanism according to an embodiment of the present invention, wherein guiding surfaces of the first locking hook and the second locking hook are in contact with each other for guiding. Referring to FIG. 3, adjacent end portions of the first locking hook 8 and the second locking hook 9 are provided with the guiding surfaces 16, 17 being capable of guiding and cooperating mutually. The functions of the guiding surfaces 16, 17 are described hereinafter.

Figure 4:
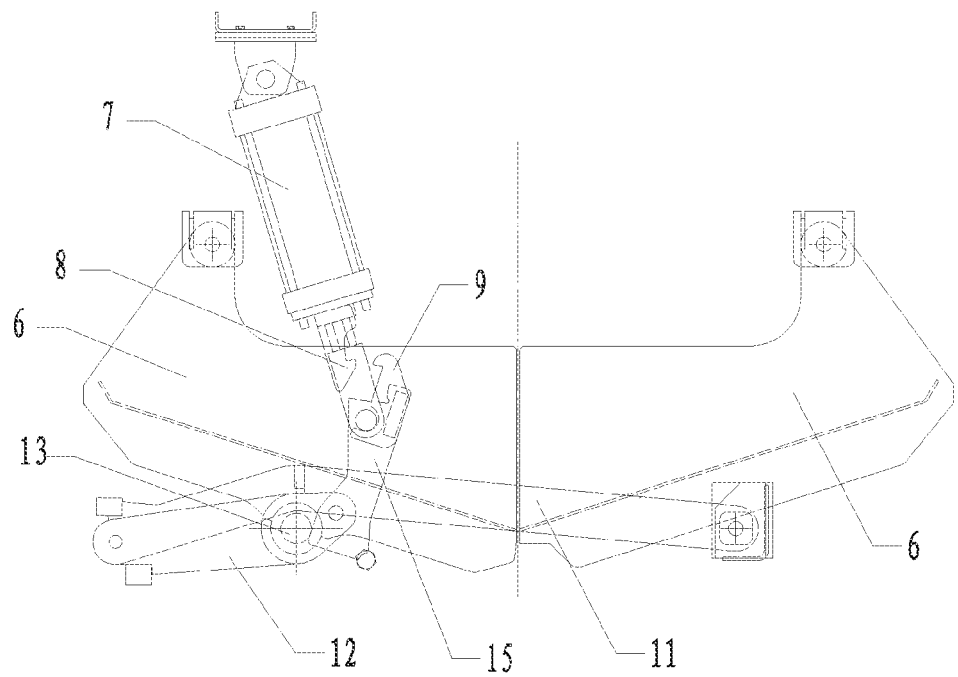
FIG. 4 is a schematic structural diagram of the first locking hook and the second locking hook in the bottom door opening-closing mechanism according to the embodiment of the present invention, wherein the first locking hook and the second locking hook are disengaged with each other.
Figure 5:
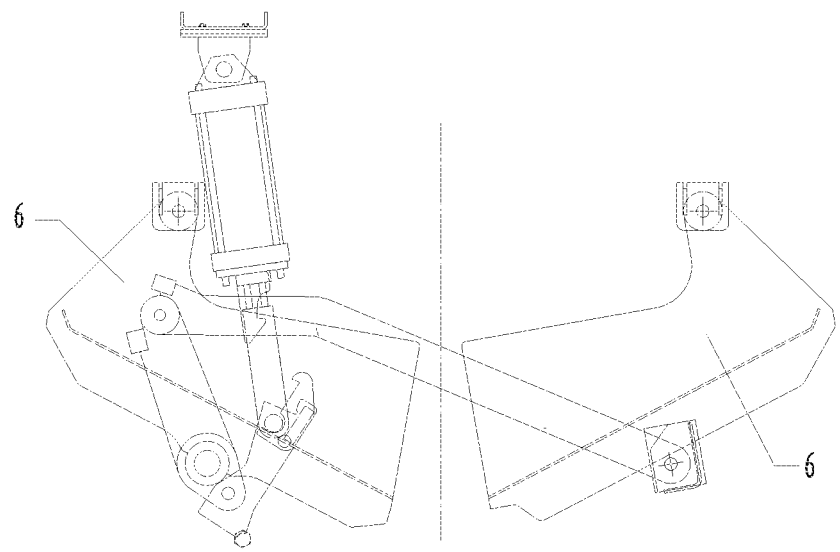
FIG. 5 is a schematic structural diagram of a bottom door device according to the embodiment of the present invention, in which the bottom doors are in opened state.
Figure 6:
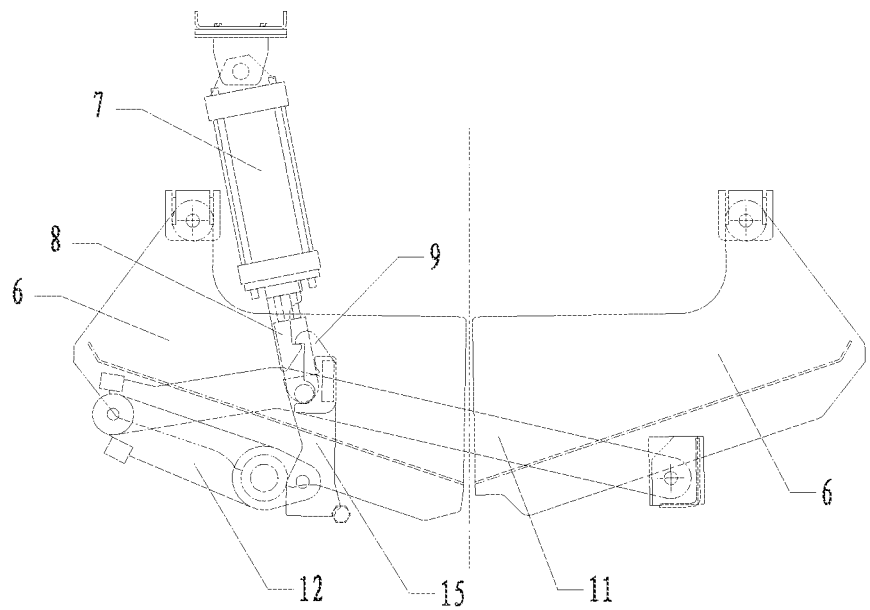
FIG. 6 is a schematic structural diagram of the first locking hook and the second locking hook in the bottom door opening-closing mechanism according to the embodiment of the present invention, wherein the first locking hook and the second locking hook are caught with each other so as to be in a secondary locking state.

The operation process of opening the bottom doors and the secondary locking in the drop-bottom hopper car according to the embodiment will be described hereinafter in conjunction with FIGS. 3 to 6. FIG. 3 is a schematic structural diagram of a first locking hook and a second locking hook in the bottom door opening-closing mechanism according to an embodiment of the present invention, wherein guiding surfaces of the first locking hook and the second locking hook are in contact with each other for guiding; FIG. 4 is a schematic structural diagram of the first locking hook and the second locking hook in the bottom door opening-closing mechanism according to the embodiment of the present invention, wherein the first locking hook and the second locking hook are disengaged with each other; FIG. 5 is a schematic structural diagram of a bottom door device according to the embodiment of the present invention, in which the bottom doors are in opened state; and FIG. 6 is a schematic structural diagram of the first locking hook 8 and the second locking hook 9 in the bottom door opening-closing mechanism according to the embodiment of the present invention, wherein the first locking hook and the second locking hook are caught with each other so as to be in a secondary locking state. As shown in FIG. 4, when the bottom doors are desired to be opened, the piston rod of the bottom door opening-closing drive cylinder 7 moves outwardly. Since there is a clearance between the transmission shaft 13 and the swing rod 15, the swing rod 15 is pushed to rotate clockwise about the hinge joint between the swing rod itself and the second connecting rod 12 as the piston rod moves outwardly, so that the first locking hook 8 on the cylinder body is disengaged from the second locking hook 9 on the swing rod 15. In order that the first locking hook 8 can be disengaged smoothly from the second locking hook 9, the acting surface of the first locking hook 8 used to catch the second locking hook 9 is flat. After the first locking hook 8 is disengaged from the second locking hook 9, the piston rod of the bottom door opening-closing drive cylinder 7 continuously moves outwardly, so that the five-connecting-rod mechanism consisted of the two bottom doors 6, the swing rod 15, the first connecting rod 11 and the second connecting rod 12 passes across its dead point, and the bottom doors 6 are eventually opened, as shown in FIG. 5, When the bottom doors 6 are to be closed, the piston rod of the bottom door opening-closing drive cylinder 7 retracts and drives the swing rod 15 to move, so that the guiding surface 11 7 of an end portion of the second locking hook 9 fixed on the swing rod 15 contacts with the guiding surface 16 of an end portion of the first locking hook 8, as shown in FIG. 3. As the piston rod retracts, the guiding surface 17 slides along the guiding surface 16 to achieve the guiding and cooperating of the second locking hook 9 and the first locking hook 8, so that the swing rod 15 and the bottom door opening-closing drive cylinder 7 move along their respective given courses till the two bottom doors 6 are closed, After the two bottom doors 6 are closed, the piston rod of the bottom door opening-closing drive cylinder 7 keeps on retracting, so that the five-rod-linkage mechanism consisted of the two bottom doors 6, the swing rod 15, the first connecting rod 11 and the second connecting rod 12 passes across its dead point, till there is a certain overlapping extent L between the first locking hook 8 and the second locking hook 9, as shown in FIG. 2. When the bottom doors 6 are opened accidentally due to failure of the bottom. door opening-closing mechanism, the bottom door opening-closing drive cylinder 7 keep still, but the two bottom doors 6 rotate downwardly about their respective hinged shafts and drive the first connecting rod 11 and the second connecting rod 12 to move together. Meanwhile, the second connecting rod 12 in turn drives the swing rod 15 to move downwardly, so that the second locking hook 9 is caught by the first locking hook 8, as shown in FIG. 6. In this way, the two bottom doors 6 are prevented from being further opened, thereby achieving the secondary locking, avoiding the discharge of cargo, and ensuring the traffic safety.

It should be noted that the above embodiments are only for the illustration of the technical solutions of the present invention, and do not limit the present invention. Though the present invention has been described in detail in conjunction with the above-mentioned embodiments, it is to be appreciated by those skilled in the art that numerous variations and modifications can be made to the present invention without departing from the scope of the present invention defined by the appended claims.

The invention claimed is:

1. A bottom door opening-closing mechanism, comprising a first connecting rod, a second connecting rod, a swing rod, a bottom door opening-closing drive cylinder and a transmission shaft, wherein the swing rod is hinged to the second connecting rod and a piston rod of the bottom door opening-closing drive cylinder, one end of the first connecting rod is hinged to the second connecting rod, the transmission shaft is connected to the second connecting rod, and a connection joint between the transmission shaft and the second connecting rod is located between a hinge point between the first connecting rod and the second connecting rod and a hinge point between the second connecting rod and the swing rod, and wherein a cylinder body of the bottom door opening-closing drive cylinder is fixedly connected with a first locking hook, and the swing rod is fixedly connected with a second locking hook, the second locking hook and the first locking hook are configured to be capable of catching with each other.

2. The bottom door opening-closing mechanism according to claim 1, wherein the transmission shaft is fixedly connected to the second connecting rod.

3. The bottom door opening-closing mechanism according to claim 2, wherein the first locking hook has a flat surface configured to be hooked and cooperated with the second locking hook.

4. The bottom door opening-closing mechanism according to claim 2, wherein the bottom door opening-closing drive cylinder is a pneumatic cylinder, a hydraulic cylinder or a linear actuator.

5. The bottom door opening-closing mechanism according to claim 2, wherein adjacent end portions of the first locking hook and the second locking hook are provided with guiding surfaces capable of guiding and cooperating mutually.

6. The bottom door opening-closing mechanism according to claim 1, wherein the first locking hook has a flat surface configured to be hooked and cooperated with the second locking hook.

7. The bottom door opening-closing mechanism according to claim 1, wherein the bottom door opening-closing drive cylinder is a pneumatic cylinder, a hydraulic cylinder or a linear actuator.

8. The bottom door opening-closing mechanism according to claim 1, wherein adjacent end portions of the first locking hook and the second locking hook are provided with guiding surfaces capable of guiding and cooperating mutually.

9. A bottom door device, comprising two bottom doors and the bottom door opening-closing mechanism according to claim 1, wherein the transmission shaft of the bottom door opening-closing mechanism is rotatably connected to one of the bottom doors, and the other one of the bottom doors is hinged to the first connecting rod of the bottom door opening-closing mechanism.

10. A drop-bottom hopper car, comprising a car body with a discharge opening at the bottom thereof, and the bottom door device according to claim 9, wherein the bottom doors of the bottom door device are hinged at the discharge opening, the cylinder body of the bottom door opening-closing drive cylinder of the bottom door device is hinged to the car body, and there is a clearance between the transmission shaft of the bottom door device and the swing rod of the bottom door device.

11. The drop-bottom hopper car according to claim 10, wherein the transmission shaft is fixedly connected to the second connecting rod.

12. The drop-bottom hopper car according to claim 10, wherein the first locking hook has a flat surface configured to be hooked and cooperated with the second locking hook.

13. The drop-bottom hopper car according to claim 10, wherein the bottom door opening-closing drive cylinder is a pneumatic cylinder, a hydraulic cylinder or a linear actuator.

14. The bottom door device according to claim 9, wherein the transmission shaft is fixedly connected to the second connecting rod.

15. The bottom door device according to claim 14, wherein the first locking hook has a flat surface configured to be hooked and cooperated with the second locking hook.

16. The bottom door device according to claim 14, wherein the bottom door opening-closing drive cylinder is a pneumatic cylinder, a hydraulic cylinder or a linear actuator.

17. The bottom door device according to claim 14, wherein adjacent end portions of the first locking hook and the second locking hook are provided with guiding surfaces capable of guiding and cooperating mutually.

18. The bottom door device according to claim 9, wherein the first locking hook has a flat surface configured to be hooked and cooperated with the second locking hook.

19. The bottom door device according to claim 9, wherein the bottom door opening-closing drive cylinder is a pneumatic cylinder, a hydraulic cylinder or a linear actuator.

20. The bottom door device according to claim 9, wherein adjacent end portions of the first locking hook and the second locking hook are provided with guiding surfaces capable of guiding and cooperating mutually.

* * * * *